June 26, 1928.  1,674,762

H. A. CLARK

OIL SEAL

Filed April 30, 1927

Witness:
P. Burkhardt

Inventor:
Harold A. Clark,
By Cromwell, Greist & Warden
Attys.

Patented June 26, 1928.

1,674,762

UNITED STATES PATENT OFFICE.

HAROLD A. CLARK, OF HIGHLAND PARK, ILLINOIS, ASSIGNOR TO THE CHICAGO RAWHIDE MANUFACTURING COMPANY, OF CHICAGO, ILLINOIS, A CORPORATION OF ILLINOIS.

OIL SEAL.

Application filed April 30, 1927. Serial No. 187,723.

This invention has to do with oil seals, such as are adapted to be positioned within a tubular housing about a rotatable shaft for preventing grease, oil, or other liquid from flowing through the housing beyond a certain point in the same.

The object of the invention is to provide an improved oil seal which may be used quite effectively in automobiles for preventing the lubricant in the differential from flowing out from the ends of the rear axle housing.

While the improved oil seal is particularly well suited for use in the specific association mentioned, it obviously may be used in other connections with very good results, since the invention, from its very nature, is capable of rather general application.

The flanged packings heretofore used as oil seals in automobiles are objectionable in that they will permit a gradually increasing seepage of oil past the same after they have been in service for some time, since the rear axle is seldom absolutely concentric with the housing, and the opening in the packing through which the axle extends will in time assume a slightly eliptical shape.

The oil seal of the invention is constructed in such a way as to overcome this difficulty. The packing member in which the axle turns is in sealed engagement with a cage member which is in turn in sealed engagement with the inner wall of the housing, and the packing member, which is made of flexible leather or other suitable material, is constricted snugly about the shaft by an endless coil spring, which encircles the packing member under tension. The packing member, although in sealed engagement with the cage, is shiftable relative to the same, whereby to maintain a fluid-tight closure irrespective of any position into which the packing member is caused to float by reason of the shaft being eccentric relative to the housing.

One form of the invention is presented herein for the purpose of exemplification, but it will of course be appreciated that the invention is susceptible of embodiment in other variously modified forms coming equally within the comprehensive scope of the appended claims.

Figure 1:
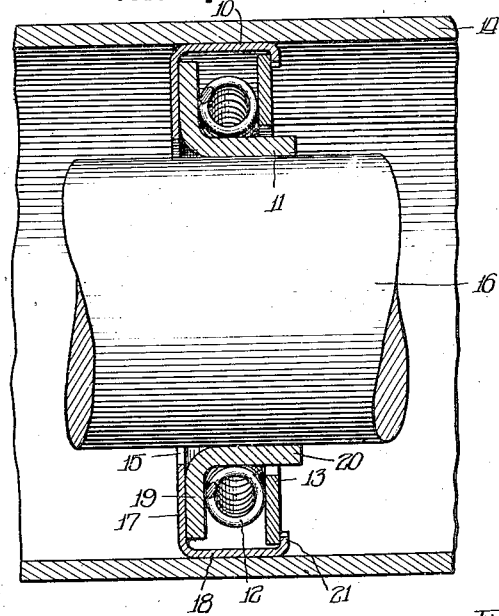
Fig. 1 is a diametric section through a rear axle housing, showing the improved oil seal in position near one end of the housing about the rear axle.
Figure 2:
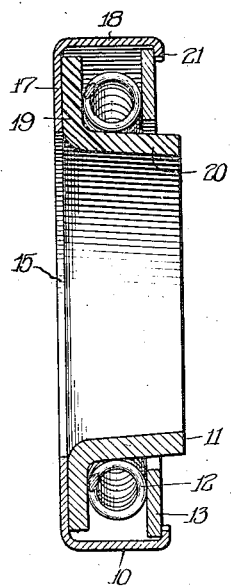
Fig. 2 is a diametric section through the seal.
Figure 3:
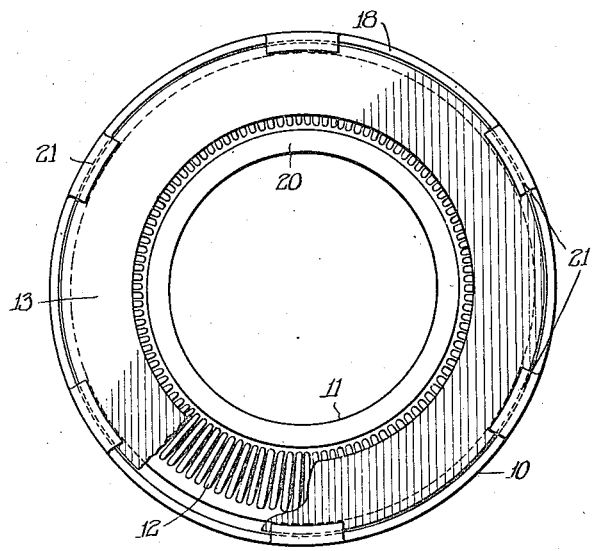
Fig. 3 is an end view of the seal.

As will be observed in the drawing, the seal consists of a cage 10, a packing 11, a spring 12, and a washer 13.

The cage 10 is a sheet metal stamping which is adapted to be positioned within the housing 14 in peripherally sealed association with the inner wall of the same. The cage has an opening 15 through which the axle 16 extends, and is characterized by a flat portion 17 and a cylindrical portion 18, the flat portion being in sealed engagement with the packing 11, and the cylindrical portion being in sealed engagement with the housing 14.

The packing 11 is made of slightly flexible leather or other suitable material, and is characterized by a flat portion 19 and a conical portion 20, the flat portion being in sealed association with the flat portion 17 of the cage, and the conical portion 20, which is distended to more nearly cylindrical form when positioned about the axle 16, being in sealed association with the axle. The portion 19 of the packing is slightly smaller than the portion 17 of the cage, whereby to permit the portion 19 to shift relative to the portion 17.

The spring 12 is an endless coil of spring wire which encircles the portion 20 of the packing and exerts pressure inwardly against the same, thereby serving to hold the portion 20 in fluid-tight association with the axle.

The washer 13 is positioned within the cage against the spring, and serves to maintain the portion 19 of the packing against the portion 17 of the cage. The washer is positioned within the cage under pressure in order to compress the portion 19 of the packing, and is permanently held in such position by a number of inturned ears 21 which are formed on the portion 18 of the cage.

With the parts assembled in the relation and manner described, the portion 19 of the packing will be maintained in sealed engagement with the portion 17 of the cage irrespective of the position into which it may be caused to float by reason of the shaft being eccentric relative to the housing, and the portion 20 of the packing will be maintained in sealed engagement with the surface of the axle rotating therein.

I claim:

1. In a seal, a cage having a flat annular portion, a packing shiftably mounted in the cage and having a flat annular portion, an endless coil spring positioned against the flat portion of the packing and encircling the packing under tension for constricting the packing about a shaft rotating within the same, and a washer positioned under pressure in the cage against the spring for maintaining the flat annular portion of the packing in sealed association with the flat annular portion of the cage, said flat annular portion of the packing being of substantially uniform thickness at the point where it is engaged by the spring.

2. In a seal, a cage, a sheet leather packing shiftably mounted in the cage and having a radial flange portion of substantially uniform thickness in sealed association with the cage and an axial sleeve portion for sealed association with a shaft, and an endless coil spring encircling the sleeve portion under tension in lateral abutment with the flange portion for constricting the sleeve portion on the shaft and holding the flanged portion against the cage, said sleeve portion being of conical form before application to a shaft and being distensible to cylindrical form upon application against both the resistance of the sleeve portion and that of the spring.

3. In a seal, two axially spaced centrally apertured cage members one of which is provided at its outer periphery with an axially extending rim which fits over and interlocks with the outer periphery of the other member, a flexible sheet packing which is shiftable radially within the space enclosed by said cage members and has a radially flanged portion of substantially uniform thickness in sealed association with the inner face of one of said cage members and an axially sleeved portion of smaller inside diameter than the apertures in said cage members for sealed association with a shaft passing through the same, and a resiliently yieldable member which is clamped under pressure between the radially flanged portion of said packing and the inner face of the other of said cage members about the axially sleeved portion of said packing for maintaining said sealed associations.

4. In a seal, two axially spaced centrally apertured cage members, a flexible sheet packing which is shiftable radially within the space enclosed by said cage members and has a radially flanged portion of substantially uniform thickness in sealed association with the inner face of one of said cage members and an axially sleeved portion of smaller inside diameter than the apertures in said cage members for sealed association with a shaft passing through the same, and a spring member which is positioned about the axially sleeved portion of said packing and is clamped under pressure against the radially flanged portion of said packing by the inner face of the other of said cage members.

In testimony whereof I have hereunto subscribed my name.

HAROLD A. CLARK.